United States Patent Office 3,644,527
Patented Feb. 22, 1972

3,644,527
16-METHYL AND 16-METHYLENE-B-NORTESTOSTERONES
Kenneth G. Holden, Haddonfield, N.J., and James F. Kerwin, Broomall, Pa., assignors to Smith Kline & French Laboratories, Philadelphia, Pa.
No Drawing. Continuation-in-part of application Ser. No. 373,877, June 9, 1964, now Patent No. 3,488,738. This application Sept. 23, 1969, Ser. No. 860,404
Int. Cl. C07c *35/00, 49/00*
U.S. Cl. 260—586 H
3 Claims

ABSTRACT OF THE DISCLOSURE

16β-methyl and 16-methylene substituted β-nordehydroepiandrosterones and 17-methyl-B-nortestosterones are prepared by using as a key reaction the degradation of a 16 - dialkylaminomethyl-B-nordehydroepiandrosterone to produce the 16-methylene derivative. This in turn is hydrogenated to the 17β-methyl-B-nor compound. These compounds have prolonged hypotensive activity.

---

This application is a continuation-in-part of Ser. No. 373,877, filed June 9, 1964, now U.S. Pat. No. 3,488,738 issued Jan. 6, 1970.

The compounds of this invention are B-nordehydroepiandrosterones and B-nortestosterones characterized by the presence of a 16β-methyl or preferably a 16-methylene substituent. Representative of these compounds are those of the following structural formula:

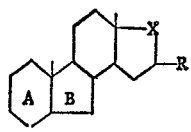

in which X is

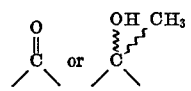

R is β-methyl or methylene and the A, B rings contain either a 3-keto-$\Delta^{4,5}$ or a 3β-hydroxy-$\Delta^{5,6}$ system.

As disclosed in the parent application referred to above, those compounds have pharmacodynamic activity such as hypotensive, central nervous system depressant and antiandrogenic activity as well as being intermediates for preparing other B-norsteroids of similar activities. The compounds here claimed are noteworthy for having long hypotensive activity. For example, the preferred species, 16-methylene-B-nordehydroepiandrosterone, administered in a 40 mg. quantity suspended in 2 ml. sesame oil per kilogram of rat in one dose subcutaneously significantly lowers systolic blood pressure in metacorticoid hypertensive rats for 7 days. Similarly this compound at 10 mg. in 2 ml. sesame oil per kilogram once a day subcutaneously for 5 days significantly lowered systolic pressure in hypertensive rats with activity continuing for 4 days post-drug with no mortalities.

The compounds of this invention are prepared by the reactions outlined hereafter or variations of those processes which would be obvious to those skilled in the art.

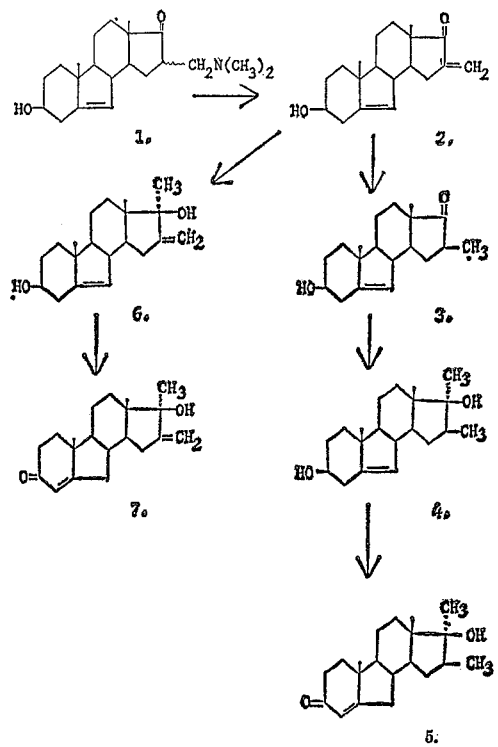

The starting materials for these reactions are the 16-Mannich base derivatives of Formula 1, the preparation of which is described in the parent application. The Mannich base is decomposed to the 16-methylene derivative (2) by steam distillation or by heating a quaternary salt of the base. The 16-methylene derivative, by itself an active compound, is then converted either to a desired 16-methyl compound or to a 16-methylene B-nortestosterone all by chemical processes well known to the steroid art.

Alternatively, but with less advantage, the appropriate derivatives with proper modifications at 17 and in the A, B rings may be prepared in the Mannich base series. The Mannichs are then decomposed to the 16-methylene compounds of this invention and, optionally, further reduced to the 16-methyl derivatives.

The following examples will illustrate these preparative methods in more detail.

EXAMPLE 1

A solution of 9.0 g. of 16α-dimethylaminomethyl-B-nordehydroepiandrosterone, M.P. 177–179° C., in 200 ml. of ethyl alcohol is steam distilled until the distillate is no longer basic. The cooled nonvolatile aqueous mixture is extracted with methylene chloride. The methylene chloride extracts are combined, dried, and evaporated to a residue. Chromatography of the residue on 150 g. of alumina (activity III Woelm) gives 16-methylene-B-nordehydroepiandrosterone on elution with benzene, M.P. 121–122° C. after recrystallization from acetone-hexane.

EXAMPLE 2

A solution of 1.0 g. of 16-methylene-B-nordehydroepiandrosterone in 50 ml. of alcohol is hydrogenated at 15 lb./sq. in for 30 minutes in the presence of 0.2 g. of 10% palladium-on-charcoal. The reaction mixture is filtered and the filtrate evaporated to a residue. Recrystallization of the residue from acetone-hexane gives 16β-methyl-B-nordehydroepiandrosterone, M.P. 132–134° C.

EXAMPLE 3

To a solution of 10.0 g. of 16β-methyl-B-nordehydroepiandrosterone in 200 ml. of benzene is added 110 ml. of 3 M methyl magnesium bromide solution in ether-benzene. The addition is carried out slowly with stirring and cooling under nitrogen. After one hour at room temperature the reaction mixture is heated to reflux for an additional hour, cooled and poured into a cold aqueous solution of ammonium chloride and hydrochloric acid. The benzene layer is separated and the aqueous layer is extracted with methylene chloride. Evaporation of the combined and dried organic phases give 3β,17β-dihydroxy-16β,17α-dimethyl-B - norandrost-5-ene, M.P. 188–197° C. after recrystallization from acetone-hexane.

EXAMPLE 4

By treatment with cyclohexanone and aluminum isopropoxide in toluene under standard reaction conditions, 3β,17β-dihydroxy-16β,17α-dimethyl-B - norandrost - 5 - ene (1 g.) is converted to 16β,17α-dimethyl-B-nortestosterone, M.P. 150–151° C. after recrystallization from acetone.

EXAMPLE 5

A solution of 3 g. of 16-methylene-B-nordehydroepiandrosterone in 100 ml. of tetrahydrofuran is treated with 3 molar equivalents of stock methyl lithium-ether solution at room temperature with stirring under a nitrogen atmosphere. When the addition is complete the reaction mixture is refluxed for 2 hours, cooled, poured into 10 volumes of water and extracted with methylene chloride. Evaporation of the dried methylene chloride extracts gives a residue of 3β,17β - hydroxy - 17α - methyl - 16 - methylene - B - norandrost-5-ene, which is in turn oxidized using aluminum isopropoxide and cyclohexanone as in Example 4 to give 17α-methyl-16-methylene-B-nortestosterone.

What is claimed is:
1. A compound of the formula:

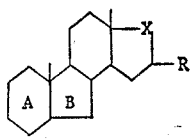

in which X is

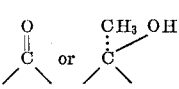

R is methylene and the configuration in the A, B rings is either 3-keto-$\Delta^{4,5}$ or 3-hydroxy-$\Delta^{5,6}$.

2. The compound of claim 1 in which X is

R is methylene and the A, B rings contain the 3-hydroxy-$\Delta^{5,6}$ system, said compound being 16-methylene-B-nordehydroepiandrosterone.

3. The compound of claim 1 in which X is

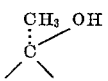

R is methylene and the A, B rings contain the 3-keto-$\Delta^{4,5}$ system, said compound being 17α-methyl-16-methylene-B-nortestosterone.

References Cited
UNITED STATES PATENTS 3,334,140  8/1967  Kerwin _____ 260—586 H LEON ZITVER, Primary Examiner G. A. SCHWARTZ, Assistant Examiner U.S. Cl. X.R.

260—617 F; 424—331